(12) United States Patent
Yoshida et al.

(10) Patent No.: US 11,383,758 B2
(45) Date of Patent: Jul. 12, 2022

(54) POWER STEERING APPARATUS

(71) Applicant: HITACHI AUTOMOTIVE SYSTEMS, LTD., Hitachinaka (JP)

(72) Inventors: Osamu Yoshida, Yokohama (JP); Tatsuyoshi Maruyama, Atsugi (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 58 days.

(21) Appl. No.: 16/647,981

(22) PCT Filed: Sep. 4, 2018

(86) PCT No.: PCT/JP2018/032687
§ 371 (c)(1),
(2) Date: Mar. 17, 2020

(87) PCT Pub. No.: WO2019/058949
PCT Pub. Date: Mar. 28, 2019

(65) Prior Publication Data
US 2020/0262469 A1    Aug. 20, 2020

(30) Foreign Application Priority Data

Sep. 22, 2017 (JP) ............................. JP2017-181978

(51) Int. Cl.
*B62D 5/04* (2006.01)
(52) U.S. Cl.
CPC .......... *B62D 5/0448* (2013.01); *B62D 5/0403* (2013.01); *B62D 5/0424* (2013.01)
(58) Field of Classification Search
CPC ... B62D 5/0448; B62D 5/0403; B62D 5/0424
See application file for complete search history.

(56) References Cited

U.S. PATENT DOCUMENTS

| 2005/0133297 A1* | 6/2005 | Chikaraishi ............. F16H 7/023 180/444 |
| 2015/0060187 A1* | 3/2015 | Yamaguchi .......... B62D 5/0448 180/444 |

(Continued)

FOREIGN PATENT DOCUMENTS

| JP | S55-082544 U | 6/1980 |
| JP | S59-077649 U | 5/1984 |

(Continued)

OTHER PUBLICATIONS

International Search Report issued in corresponding application No. PCT/JP2018/032687 dated Oct. 30, 2018 with English translation.

(Continued)

*Primary Examiner* — Minnah L Seoh
*Assistant Examiner* — Abigail R Hymel
(74) *Attorney, Agent, or Firm* — Foley & Lardner LLP

(57) ABSTRACT

The present invention provides a power steering apparatus capable of improving a noise/vibration characteristic derived from a pitch difference. Assuming that a belt pitch refers to a pitch between a plurality of belt tooth portions, the belt pitch in a first state refers to the belt pitch when the power steering apparatus is in an unloaded state that no electric power is supplied to an electric motor, the belt pitch in a second state refers to the belt pitch on one side pulled by a motor pulley when electric power is supplied to the electric motor, and a first pulley pitch refers to a pitch between a plurality of tooth portions of a first pulley, which is one of the motor pulley and a nut pulley that is a pulley on a smaller diameter side, a power steering apparatus satisfies Equation 1: the belt pitch in the first state<the first pulley pitch, and Equation 2: an absolute value of (the first pulley pitch−the belt pitch in the second state)<the first pulley pitch−the belt pitch in the first state.

7 Claims, 6 Drawing Sheets

(56) References Cited

U.S. PATENT DOCUMENTS

2015/0152941 A1 6/2015 Sekiguchi
2017/0097067 A1* 4/2017 Yamamoto ........... B62D 5/0424

FOREIGN PATENT DOCUMENTS

| JP | H04-331844 | A |   | 11/1992 |           |
|----|------------|---|---|---------|-----------|
| JP | H04331844  | A | * | 11/1992 |           |
| JP | H05-106696 | A |   | 4/1993  |           |
| JP | H09-159000 | A |   | 6/1997  |           |
| JP | 2016-141277| A |   | 8/2016  |           |
| JP | 2017-144805| A |   | 8/2017  |           |
| JP | 2017144805 | A | * | 8/2017  |           |
| WO | WO-2014/024377 | A1 |   | 2/2014 |         |
| WO | WO-2014024377  | A1 | * | 2/2014 | ............. B62D 5/04 |

OTHER PUBLICATIONS

Written Opinion issued in corresponding application No. PCT/JP2018/032687 dated Oct. 30, 2018 with English translation.

* cited by examiner

POWER STEERING APPARATUS

TECHNICAL FIELD

The present invention relates to a power steering apparatus.

BACKGROUND ART

PTL 1 discloses a power steering apparatus configured to transmit a driving force of an electric motor to a ball screw mechanism via a motor pulley, an endless belt, and a nut pulley to convert it into an axial thrust force of a rack shaft.

CITATION LIST

Patent Literature

[PTL 1] Japanese Patent Application Public Disclosure No. 2016-141277

SUMMARY OF INVENTION

Technical Problem

However, the above-described conventional power steering apparatus has such a problem that noise and a vibration occur at the time of a mesh due to pitch differences between tooth portions of the endless belt and both the pulleys.

One of objects of the present invention is to provide a power steering apparatus capable of improving the noise/vibration characteristic derived from the pitch difference.

Solution to Problem

According to one aspect of the present invention, a power steering apparatus is configured in such a manner that, assuming that a belt pitch refers to a pitch between a plurality of belt tooth portions, the belt pitch in a first state refers to the belt pitch when the power steering apparatus is in an unloaded state that no electric power is supplied to an electric motor, the belt pitch in a second state refers to the belt pitch on one side pulled by a motor pulley when electric power is supplied to the electric motor, and a first pulley pitch refers to a pitch between a plurality of tooth portions of a first pulley, which is one of the motor pulley and a nut pulley that is a pulley on a smaller diameter side, the power steering apparatus satisfies the belt pitch in the first state<the first pulley pitch,  (1)

and an absolute value of (the first pulley pitch−the belt pitch in the second state)<the first pulley pitch−the belt pitch in the first state.  (2)

Therefore, the noise/vibration characteristic derived from the pitch difference can be improved.

DESCRIPTION OF EMBODIMENTS

First Embodiment

Figure 1:
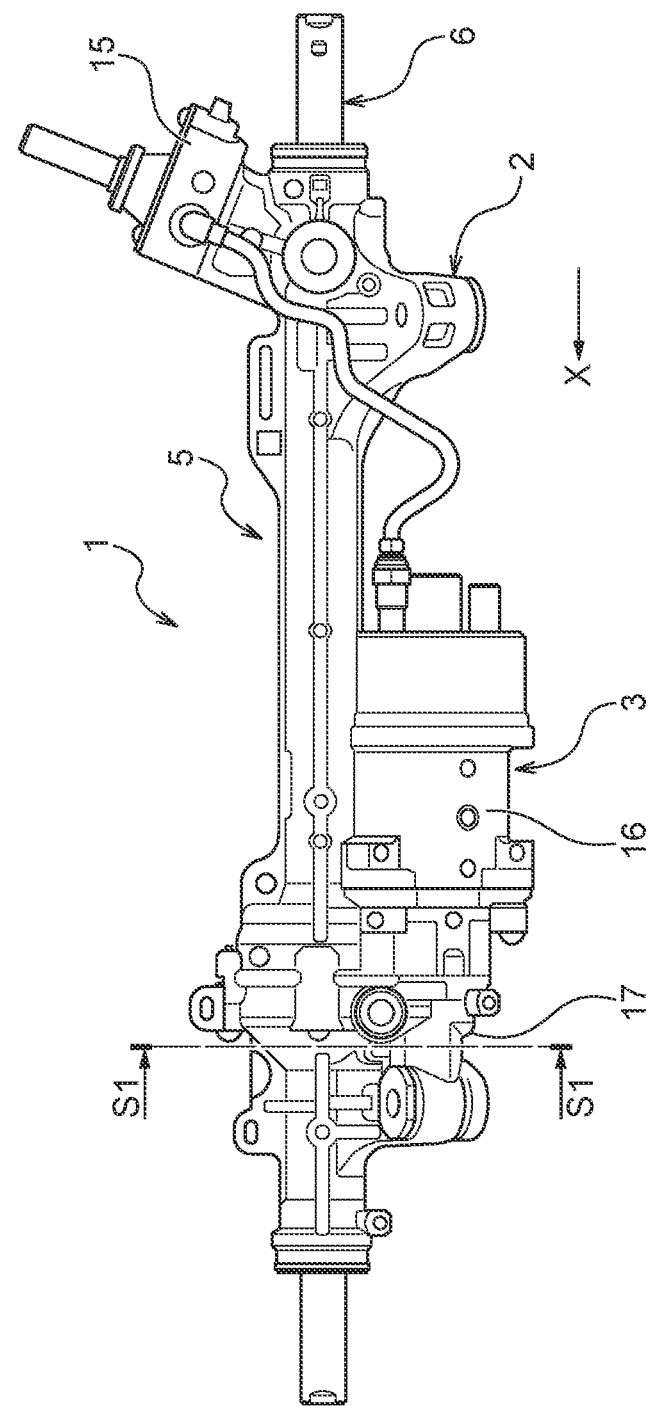
FIG. 1 is an axial cross-sectional view of a power steering apparatus 1 according to a first embodiment.
Figure 2:
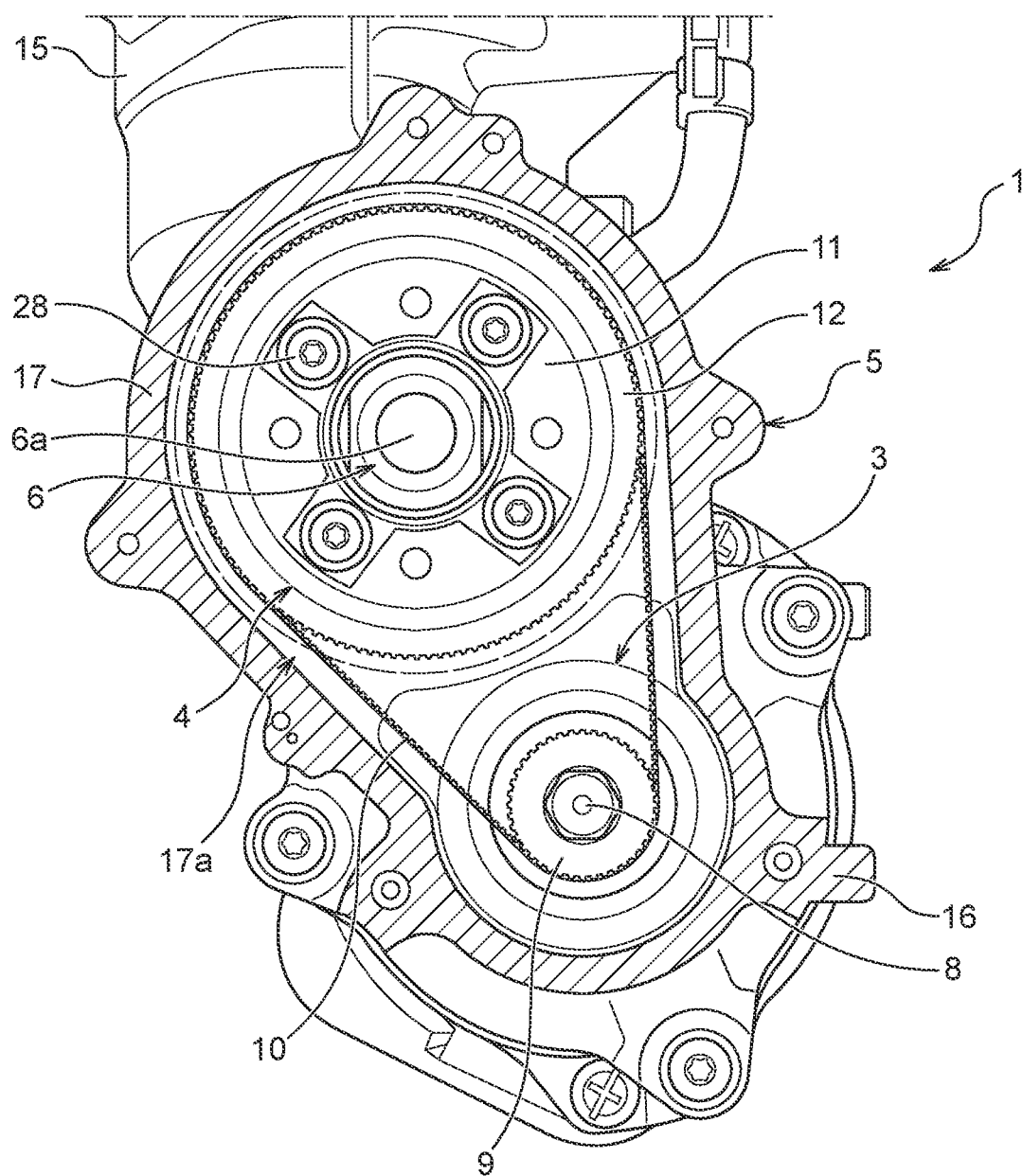
FIG. 2 is a cross-sectional view taken along a line indicated by arrows S1-S1 illustrated in FIG. 1.

FIG. 1 is an axial cross-sectional view of a power steering apparatus 1 according to a first embodiment, and FIG. 2 is a cross-sectional view taken along a line indicated by arrows S1-S1 illustrated in FIG. 1.

The power steering apparatus 1 according to the first embodiment is mounted on a vehicle that uses an engine as a power source thereof. The power steering apparatus 1 includes a steering mechanism 2, an electric motor 3, a ball screw mechanism 4, and a housing 5.

The steering mechanism 2 turns front wheels, which are steering target wheels. The steering mechanism 2 includes a rack bar 6. The rack bar 6 is a wheel turning shaft, and is formed with use of a ferrous metallic material, such as a steel material. The rack bar 6 includes a main body portion (a wheel turning shaft main body portion) 6a extending in a width direction of a vehicle body. The rack bar 6 moves in the width direction of the vehicle body according to a rotation of a steering shaft connected to a not-illustrated steering wheel. The front wheels are connected to both ends of the rack bar 6 via not-illustrate tie rods.

The electric motor 3 provides a steering force to the steering mechanism 2. The electric motor 3 is, for example, a three-phase brushless motor. An output of the electric motor 3 is controlled by a not-illustrated motor control unit according to a driver's steering torque input to the not-illustrated steering wheel and a vehicle speed. A motor pulley 9 as a first pulley is attached to a motor output shaft (an output shaft) 8 of the electric motor 3. One end side of an endless belt 10 is wound and hung on an outer periphery of the motor pulley 9.

The ball screw mechanism 4 is provided between the steering mechanism 2 and the electric motor 3. The ball screw mechanism 4 converts a rotational force of the electric motor 3 into a thrust force of the steering mechanism 2. The ball screw mechanism 4 includes a nut 11. The nut 11 includes a generally cylinder-shaped cylindrical main body portion 11a surrounding the rack bar 6. A nut pulley 12 as a second pulley is disposed an outer periphery of the nut 11. The nut pulley 12 rotates integrally with the nut 11. A rotational axis of the nut pulley 12 coincides with a rotational axis of the nut 11. The rotational axes of the nut 11 and the nut pulley 12 are disposed offset in a radial direction of the motor pulley 9 from a rotational axis of the motor pulley 9. A diameter of the nut pulley 12 is larger than a diameter of the motor pulley 9. The other end of the endless belt 10 is wound and hung on an outer periphery of the nut pulley 12. The nut 11 is supported so as to be able to rotate but unable to axially move relative to the housing 5. A ball circulation groove 13 is formed on an inner periphery of the nut 11 and an outer periphery of the rack bar 6 (refer to FIG. 3). A plurality of balls 14 is loaded in the ball circulation groove 13. Each of the balls 14 moves from one end side or the other end side of the ball circulation groove 13 according to a rotation of the nut 11. The balls 14 after reaching the one end or the other end of the ball circulation groove 13 due to the rotation of the nut 11 are returned to the other end or the one end of the ball circulation groove 13 via a tube (refer to FIG. 3) 4a, which is a circulation mechanism.

The housing 5 is formed by die casting with use of an aluminum alloy. The housing 5 includes a steering mechanism housing 15, a motor housing 16, and a ball screw mechanism housing 17. The steering mechanism housing 15 includes a rack bar containing space (a wheel turning shaft containing space) 15a, which contains a part of the steering mechanism 2 (a part of the steering shaft, a part of the rack bar 6, and the like) therein. The motor housing 16 includes an electric motor containing space, which contains the electric motor 3 therein. The ball screw mechanism housing 17 includes a ball screw mechanism containing space (a speed reducer containing space) 17a, which contains the ball screw mechanism 4 therein. The ball screw mechanism containing space 17a is disposed at an intermediate position of the rack bar containing space 15a in a longitudinal direction of the steering mechanism housing 15.

Figure 3:
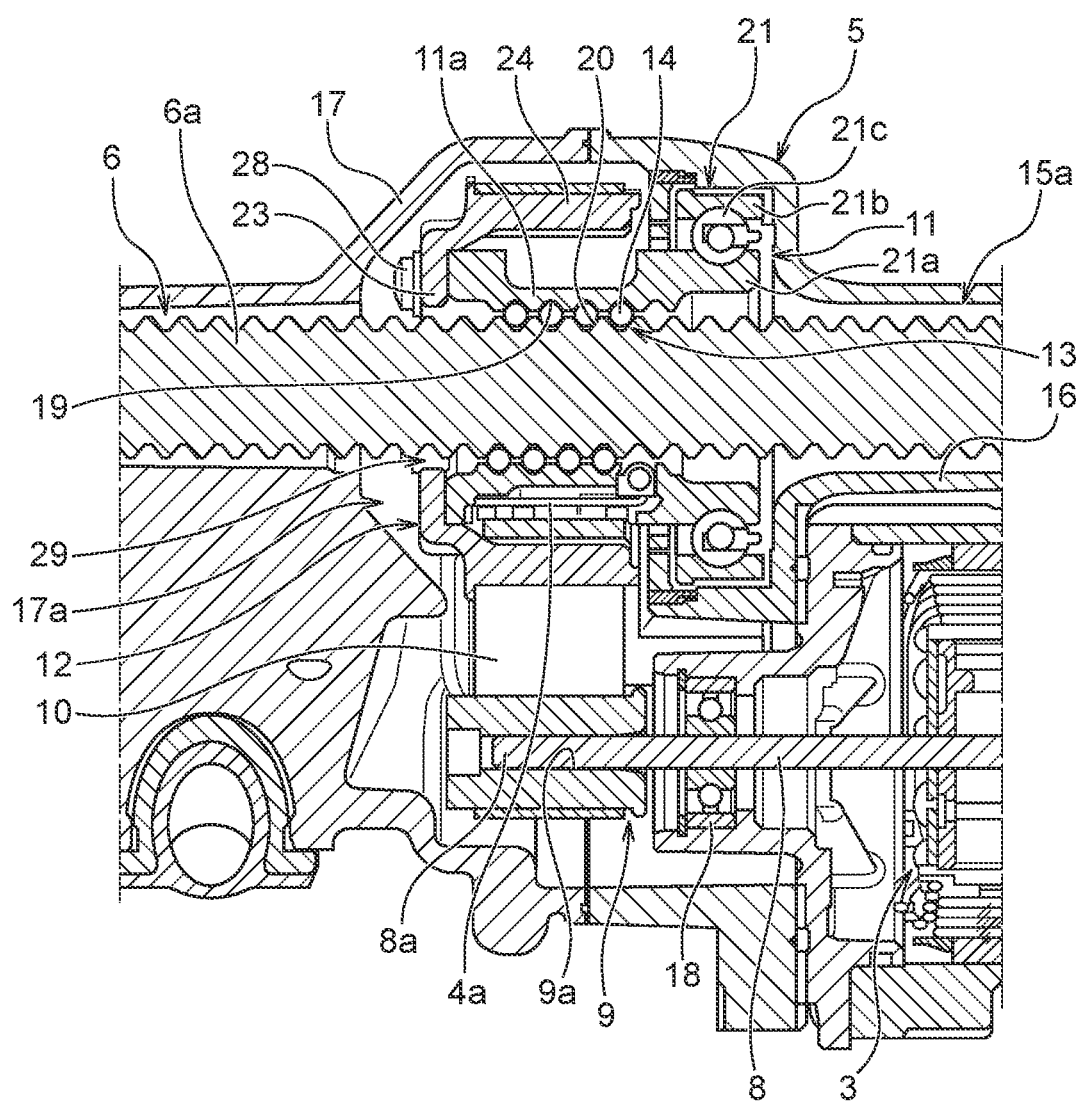
FIG. 3 is an axial cross-sectional view of a ball screw mechanism 4 that passes through a rotational axis of the nut 11.

Next, the nut 11 and the nut pulley 12 according to the first embodiment will be described in detail. In FIG. 1, an X axis is set to an axial direction of the rack bar 6, and an X axis positive direction is defined to be a direction extending from the steering mechanism housing 15 side toward the ball screw mechanism housing 17 side. Further, a radiation direction and a circumferential direction are defined to be a direction radiating from the axial direction of the rack bar 6 and a direction extending around the axial direction of the rack bar 6, respectively FIG. 3 is an axial cross-sectional view of the ball screw mechanism 4 that passes through the rotational axis of the nut 11.

The motor output shaft 8 of the electric motor 3 is disposed at a position offset in the radial direction from the rotational axis of the nut 11. The motor output shaft 8 is supported by a ball bearing 18 fixed in the motor casing 16.

The motor pulley 9 is formed cylindrically with use of a metallic material. The motor pulley 9 includes a spline hole 9a at a center thereof in the radial direction. The spline hole 9a is fitted to a spline 8a formed at a distal end of the motor output shaft 8.

The nut 11 is provided rotatably in the circumferential direction in the ball screw mechanism containing space 17a. The cylindrical main body portion 11a of the nut 11 is formed so as to have a smaller diameter at a central portion thereof in the X-axis direction than at both ends portion thereof in the X-axis direction. A helical nut-side ball screw groove 19 is formed on an inner periphery of the cylindrical main body portion 11a at the central portion thereof in the X-axis direction. On the other hand, a helical rack bar-side ball screw groove (a wheel turning shaft-side ball screw groove) 20 is formed on the outer periphery of the main body portion 6a of the rack bar 6. The ball circulation groove 13 is formed by the nut-side ball screw groove 19 and the rack bar-side, ball screw groove 20. An inner race 21a of a ball bearing 21 is integrally formed on an end of the nut 11 in the X axis negative direction. The ball bearing 21 supports the nut 11 rotatably in the circumferential direction relative to the ball screw mechanism housing 17. The ball bearing 21 includes the inner race 21a, an outer race 21b, and a ball 21c.

The outer race 21b is fixed to the ball screw mechanism housing 17. The ball 21c is disposed between the inner race 21a and the outer race 21b.

The nut pulley 12 is formed into a bottomed cup-like shape with use of a metallic material. The nut pulley 12 includes a hub portion 23 and a winding and hanging portion 24. The hub portion 23 is located at an end of the nut pulley 12 in the X-axis positive direction. The hub portion 23 is formed into a generally annular disk-like shape. The hub portion 23 is fastened to the nut 11 with use of four screws 28. The hub portion 23 includes a rack bar insertion hole 29 at a center thereof in the radial direction. The rack bar 6 extends through the rack bar insertion hole 29. The winding and hanging portion 24 extends from an outer periphery of the hub portion 23 in the X-axis negative direction. The winding and hanging portion 24 is cylindrically formed. The endless belt 10 is wound and hung on the winding and hanging portion 24.

Figure 4:
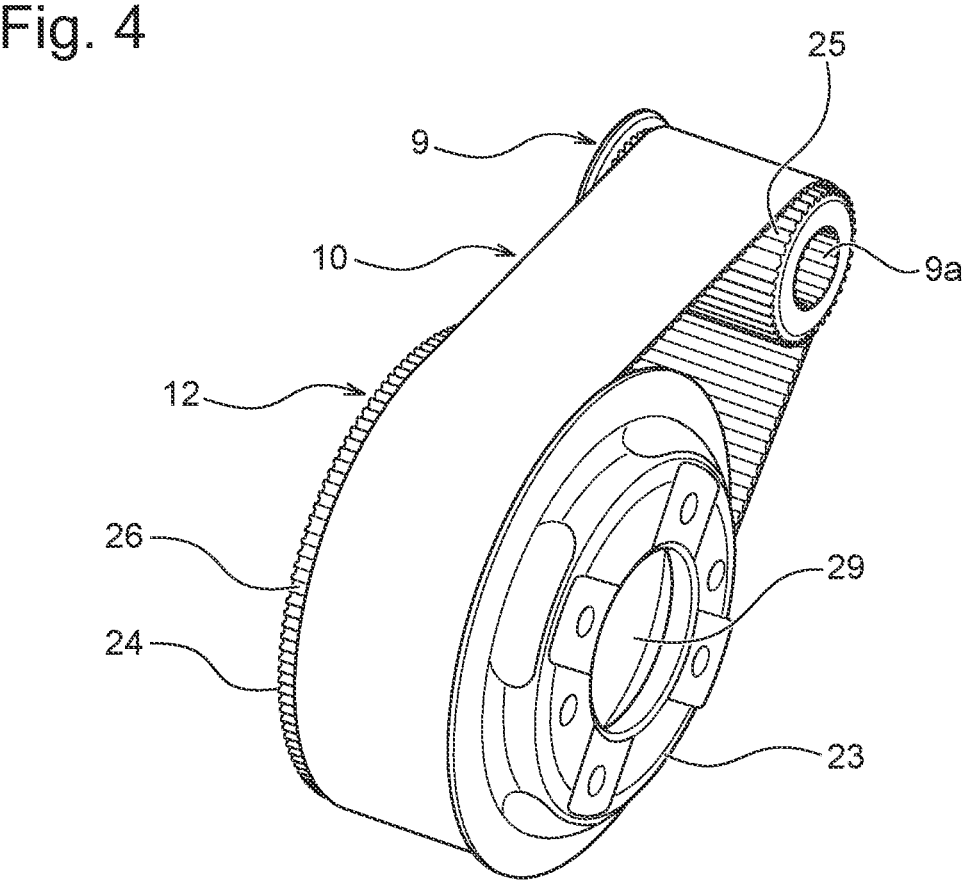
FIG. 4 is a perspective view of a motor pulley 9, an endless belt 10, and a nut pulley 12.
Figure 5:
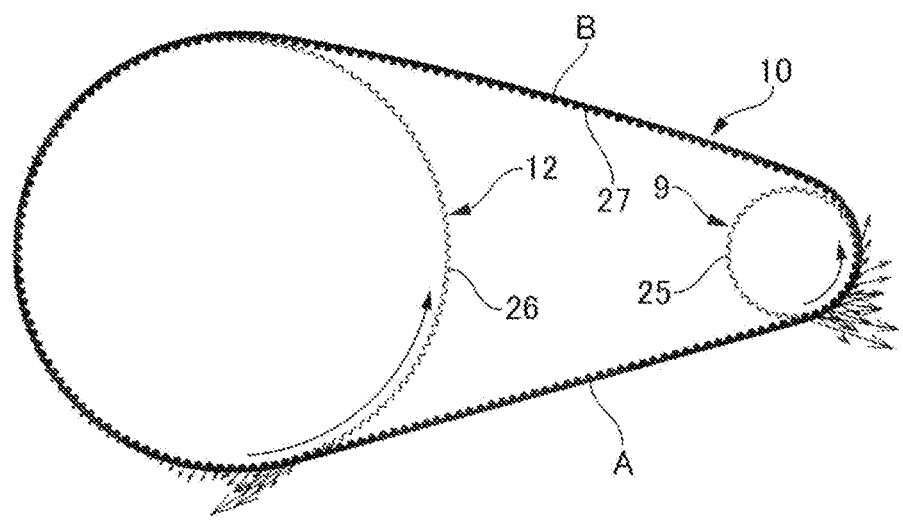
FIG. 5 is a schematic view illustrating the motor pulley 9, the endless belt 10, and the nut pulley 12 as viewed from an X-axis direction.

FIG. 4 is a perspective view of the motor pulley 9, the endless belt 10, and the nut pulley 12. FIG. 5 is a schematic view illustrating the motor pulley 9, the endless belt 10, and the nut pulley 12 as viewed from the X-axis direction.

The motor pulley 9 includes a plurality of motor pulley tooth portions 25.

The nut pulley 12 includes a plurality of nut pulley tooth portions 26.

Figure 6:
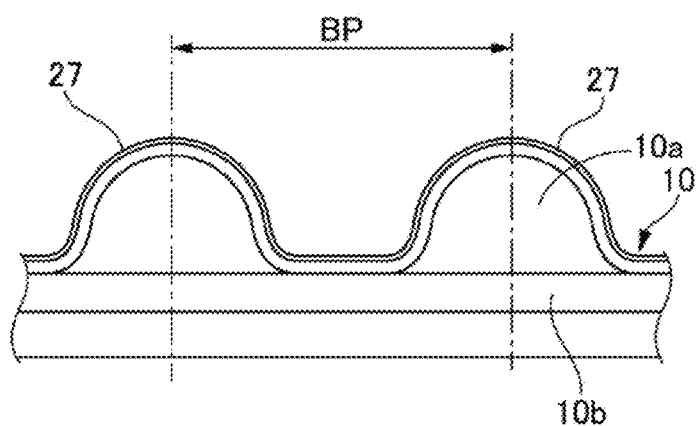
FIG. 6 is a partial enlarged view of the endless belt. 10.

The endless belt 10 includes a plurality of belt tooth portions 27. The plurality of belt tooth portions 27 is meshed with each of the plurality of motor pulley tooth portions 25 and the plurality of nut pulley tooth portions 26. FIG. 6 is a partial enlarged view of the endless belt 10, and a glass fiber is embedded in a base material 10a such as synthetic resin and rubber as a core material 10b in the endless belt 10. Therefore, a linear expansion coefficient of the endless belt 10 is smaller than a linear expansion coefficient of the motor pulley 9 made from the metallic material. Hereinafter, a distance (a pitch) between tops of the belt tooth portions 27 and 27 adjacent to each other in the endless belt 10 will be referred to as a belt pitch BP. Further, a pitch between the plurality of motor pulley tooth portions 25 and a pitch between the plurality of nut pulley tooth portions 26 will be referred to as a motor pulley pitch MPP and a nut pulley pitch NPP, respectively.

Then, when a difference (a pitch difference) is generated between the motor pulley pitch MPP and the belt pitch BP, a load change occurs when the belt tooth portions 27 and the motor pulley tooth portions 25 are meshed with each other. This load change causes noise and a vibration, thereby making a driver to feel uncomfortable. In the power steering apparatus 1 according to the first embodiment, the motor pulley pitch MPP, the nut pulley pitch NPP, and the belt pitch BP are set so as to satisfy the following equations, equations 1 to 6 with the aim of improving a noise/vibration characteristic derived from the pitch difference, $$\text{the BP} < \text{the MPP in an unloaded state} \tag{1}$$

The unloaded state refers to a state in which no electric power is supplied to the electric motor 3.

$$\begin{aligned}&\text{an absolute value of (the MPP–the BP on one side}\\&\text{pulled by the motor pulley 9 in a loaded}\\&\text{state)} < \text{the MPP–the EP in the unloaded state}\end{aligned} \tag{2}$$

The loaded state refers to a state in which electric power is supplied to the electric motor 3. The BP on one side pulled by the motor pulley 9 refers to the BP on a tight side of the endless belt 10. In FIG. 5, this BP is the BP on an A side when both the pulleys 9 and 12 rotate in the counterclockwise direction, and is the BP on a B side when both the pulleys 9 and 12 rotate in the clockwise direction.

$$\text{the BP} < \text{the NPP in the unloaded state} \quad (3)$$

$$\text{an absolute value of (the NPP−the BP on the one} \\ \text{side pulled by the motor pulley 9 in the loaded} \\ \text{state)} < \text{the NPP−the BP in the unloaded state} \quad (4)$$

$$\text{the NPP} < \text{the MPP} \quad (5)$$

$$\text{the BP in the unloaded state} < \text{the MPP} < \text{the BP on} \\ \text{the one side pulled by the motor pulley 9 in a} \\ \text{loaded state that a vehicle speed is 0 km/h} \quad (6)$$

Figure 7:
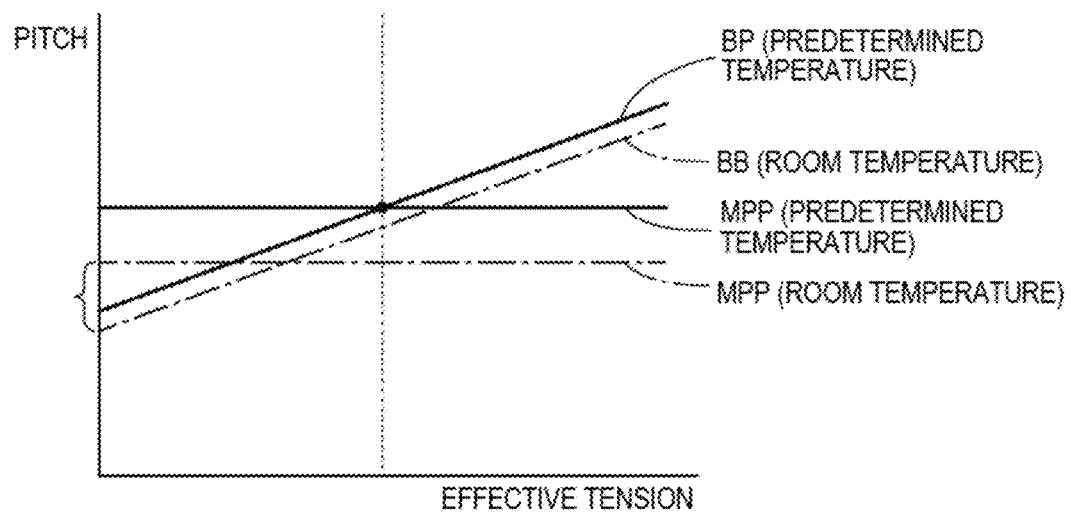
FIG. 7 illustrates a characteristic of a belt pitch BP with respect to an effective tension and an environmental temperature.

FIG. 7 illustrates a characteristic of the belt pitch BP with respect to an effective tension and an environmental temperature that satisfies the equations 1 to 4 and 6. The endless belt 10 is stretched approximately in proportion to the effective tension (a difference between a tight-side tension and a slack-side tension). Therefore, the belt pitch BP is in proportion to the effective tension (the difference between the tight-side tension and the slack-side tension). Further, the belt pitch BP increases as the environmental temperature (a temperature in an engine room) increases. On the other hand, the motor pulley pitch MPP is kept constant regardless of a change in the effective tension, but increases as the environmental temperature increases. In the first embodiment, the power steering apparatus 1 is set in such a manner that the belt pitch BP matches the motor pulley pitch MPP when the effective tension is a predetermined tension and the environmental temperature is a predetermined temperature. The predetermined tension is a tension approximately half as high as a maximum effective tension, and is, for example, an effective tension generated when the vehicle turns at a traffic intersection. The maximum effective tension refers to an effective tension when the power steering apparatus 1 is in such a load state that the vehicle speed is 0 km/h, i.e., an effective tension at the time of stationary steering. Further, the predetermined temperature is a temperature higher than 20 degrees (Celsius), which is a room temperature, and is a most widely used environmental temperature (for example, a temperature within a range of 50 to 60). In FIG. 7, the difference between the MPP and the BP is set to 0.3 µm or greater and 0.5 µm or smaller when the environmental temperature is 20 degrees.

Figure 8:
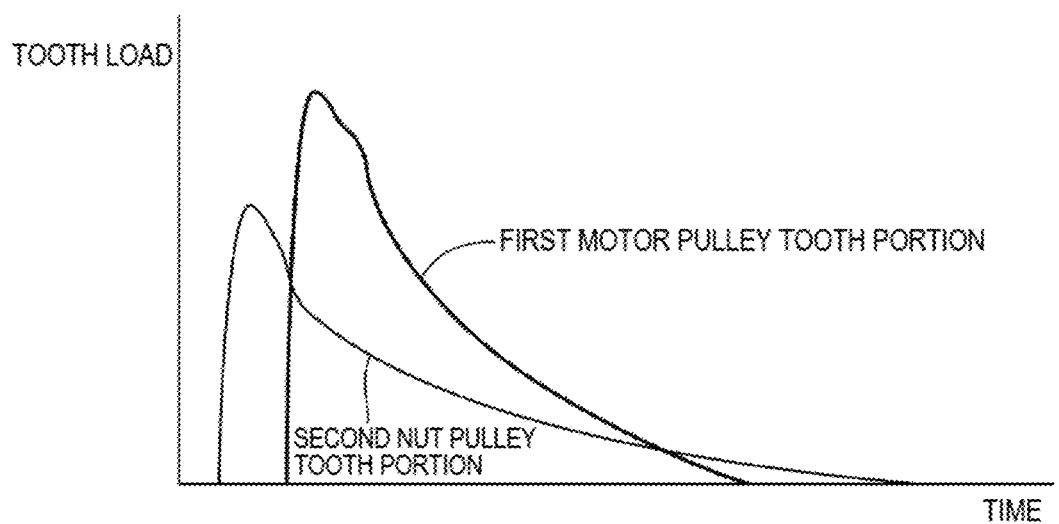
FIG. 8 is a timing chart illustrating a transition of a tooth load.

FIG. 8 is a timing chart illustrating a transition of a tooth load. Now, assume that a first motor pulley tooth portion 25a refers to the motor pulley tooth portion that is one of the plurality of motor pulley tooth portions 25 and is the motor pulley tooth portion immediately before being meshed with the belt tooth portion 27. Further, assume that a first nut pulley tooth portion 26a refers to the nut pulley tooth portion that is one of the plurality of nut pulley tooth portions 26 and is the nut pulley tooth portion immediately before being disengaged from the belt tooth portion 27. FIG. 8 illustrates each of changes in a tooth load generated between the first motor pulley tooth portion 25a and the belt tooth portion 27 and a tooth load generated between the first nut pulley tooth portion 26a and the belt tooth portion 27.

As illustrated in FIG. 8, while the first nut pulley tooth portion 26a and the belt tooth portion 27 are being disengaged from each other after starting to be gradually disengaged from each other from a state completely meshed with each other, the first motor pulley tooth portion 25a starts to be meshed with the belt tooth portion 27, and the first motor pulley tooth portion 25a and the belt tooth portion 27 are completely meshed with each other.

Next, advantageous effects of the first embodiment will be described.

The noise/vibration characteristic derived from the pitch difference can be improved by reducing the pitch differences between both the pulley tooth portions 25 and 26 and the belt tooth portions 27 in the state that the power steering apparatus 1 is actuated, i.e., in the loaded state. Then, because the motor pulley 9 is smaller in diameter than the nut pulley 12, the tooth load applied to between the motor pulley tooth portion 25 and the belt tooth portion 27 exceeds the tooth load applied to between the nut pulley tooth portion 26 and the belt tooth portion 27 on the tight side (the A side) of the endless belt 10 as illustrated in FIG. 5. Therefore, the noise/vibration characteristic can be effectively improved by reducing the pitch difference between the motor pulley tooth portions 25 and the belt tooth portions 27.

Therefore, in the first embodiment, the BP and the MPP are set in such a manner that the belt pitch BP in the unloaded state is smaller than the motor pulley pitch MPP (the equation 1), and the absolute value of the difference between MPP and the BP in the loaded state is smaller than the difference between MPP and BP in the unloaded state (the equation 2). Due to this setting, the MPP and BP become further closer to each other in the state that the power steering apparatus 1 is actuated, and therefore the noise/vibration characteristic derived from the pitch difference can be improved.

Figure 9:
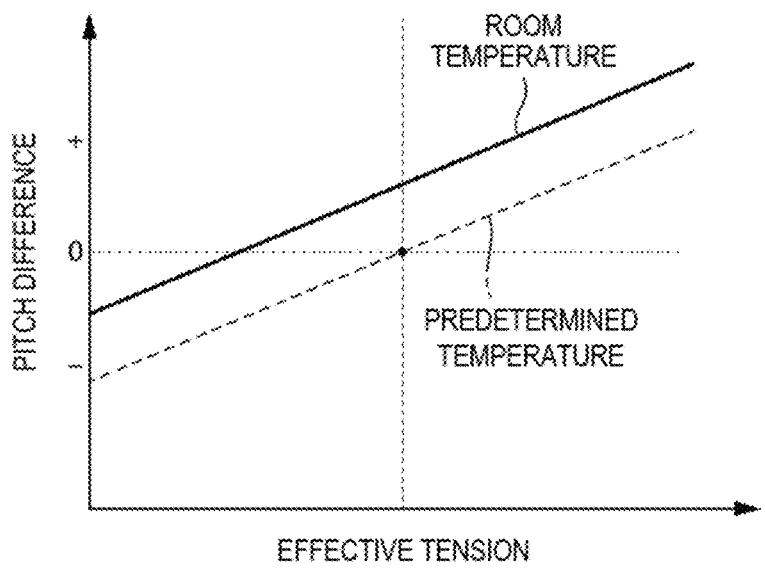
FIG. 9 illustrates a characteristic of a difference between a motor pulley pitch MPP and the belt pitch BP with respect to the effective tension and the environmental temperature.

FIG. 9 illustrates a characteristic of the difference (the pitch difference) between the motor pulley pitch MPP and the belt pitch BP with respect to the effective tension and the environmental temperature. As illustrated in FIG. 9, the pitch difference in the loaded state reduces as the environmental temperature increases from 20 degrees (the room temperature). Then, the endless belt 10 is affected by heat of the electric motor 3, an FET of a motor controller, another heat source in the engine room, and the like, and therefore the environmental temperature is higher than the room temperature. Therefore, the noise/vibration characteristic in an actual use state can be improved by establishing such a characteristic that the difference between the MPP and the BP reduces as the environmental temperature increases.

The linear expansion coefficient of the endless belt 10 is smaller than the linear expansion coefficient of the motor pulley 9. In other words, the belt pitch BP is less susceptible to a change in the environmental temperature than the motor pulley pitch MPP. Therefore, the difference between the MPP and the BP can be prevented from becoming excessive when the environmental temperature reduces from the use state, and therefore the noise/vibration characteristic can be improved in a wide range of use states from a low temperature to a high temperature.

Then endless belt 10 contains the glass fiber. The grass fiber has an extremely small linear expansion coefficient compared to the metallic material, and therefore contributes to reducing the linear expansion coefficient of the endless belt 10 to smaller than the motor pulley 9 made from the metallic material. Therefore, the difference between the motor pulley pitch MPP and the belt pitch BP can be prevented from becoming excessive when the environmental temperature reduces from the use state.

The BP and the NPP are set in such a manner that the belt pitch BP in the unloaded state is smaller than the nut pulley pitch NPP (the equation 3) and the absolute value of the difference between the NPP and the BP in the loaded state is smaller than the difference between the NPP and the BP in the unloaded state the equation 4). Due to this setting, the NPP and BP become further closer to each other in the state that the power steering apparatus 1 is actuated, and therefore the noise/vibration characteristic derived from the pitch difference can be further improved.

The nut pulley pitch NPP is smaller than the motor pulley pitch MPP (the equation 5). In other words, the mesh between the teeth in conformity with the change in the belt pitch BP of the endless belt 10 can be acquired by increasing the MPP of the motor pulley 9 with which the endless belt 10 is being meshed on the one side (the tight side) where the belt pitch BP increases as the endless belt 10 is stretched according to the driving of the electric motor 3, and reducing the NPP of the nut pulley 12 with which the slack side of the endless belt 10 is being meshed.

The endless belt 10 is configured in such a manner that, while the first nut pulley tooth portion 26a and the plurality of belt tooth portions 27 are being disengaged from each other after the first nut pulley tooth portion 26a and the plurality of belt tooth portions 27 of the endless belt 10 start to be gradually disengaged from each other from the state completely meshed with each other according to the rotation of the motor pulley 9, the first motor pulley tooth portion 25a and the plurality of belt tooth portions 27 start to be meshed with each other, and the first motor pulley tooth portion 25a and the plurality of belt tooth portions 27 are completely meshed with each other. In other words, the first motor pulley tooth portion 25a and the belt tooth portions 27 are completely meshed with each other before the first nut pulley tooth portion 26a and the belt tooth portions 27 are disengaged from each other, and therefore a mesh ratio of the motor pulley 9 and the nut pulley 12 can be prevented from changing.

The motor pulley pitch MPP is greater than the belt pitch BP in the unloaded state, and is smaller than the BP in the loaded state that the vehicle speed is 0 km/h (the equation 6). In other words, the belt pitch BP on the tight side matches the motor pulley pitch MPP at some point in a period between the unloaded state and the maximumly loaded state (the vehicle speed 0 km/h), This means that the BP and the MPP become closer to each other in a state that the power steering apparatus 1 is frequently used, and therefore the noise/vibration characteristic can be improved in a wide range of use states from a low load to a high load.

The endless belt 10 has 0.3 μm or greater and 0.5 μm or smaller as the difference between the motor pulley pitch MPP and the belt pitch BP in the unloaded state under the environmental temperature of 20 degrees. As a result, the noise/vibration characteristic when the power steering 1 is actuated can be improved.

Other Embodiments

Having described the embodiment for implementing the present invention, the specific configuration of the present invention is not limited to the configuration of the embodiment, and the present invention also includes a design modification and the like thereof made within a range that does not depart from the spirit of the present invention, if any. Further, the individual components described in the claims and the specification can be arbitrarily combined or omitted within a range that allows them to remain capable of achieving at least a part of the above-described objects or producing at least a part of the above-described advantageous effects.

The motor pulley corresponds to the first pulley and the nut pulley corresponds to the second pulley in the first embodiment, but the nut pulley corresponds to the first pulley and the motor pulley corresponds to the second pulley when the nut pulley is smaller in diameter than the motor pulley.

The motor pulley and the nut pulley may be made from synthetic resin.

In the following description, other configurations recognizable from the above-described embodiment will be described.

A power steering apparatus, in one configuration thereof, includes a wheel turning shaft including a wheel turning shaft main body and a wheel turning shaft-side ball screw groove. The wheel turning shaft-side ball screw groove is a helical groove formed on this wheel turning shaft main body. The wheel turning shaft is configured to turn a steering target wheel according to a movement of the wheel turning shaft main body in a longitudinal direction thereof. The power steering apparatus further includes a housing including a wheel turning shaft containing space containing at least a part of the wheel turning shaft and a speed reducer containing space provided at an intermediate position of the wheel turning shaft containing space in the longitudinal direction of the wheel turning shaft main body, and a nut including a cylindrical main body portion and a nut-side ball screw groove. The nut-side ball screw groove is a helical groove provided on an inner peripheral side of the cylindrical main body. The cylindrical main body is rotatably provided in the speed reducer containing space, and has a cylinder-like shape surrounding the wheel turning shaft. The power steering apparatus further includes a plurality of balls provided between the wheel turning shaft-side ball screw groove and the nut-side ball screw groove, an electric motor including an output shaft having a rotational axis provided at a position offset from a rotational axis of the nut, a motor pulley including a plurality of motor pulley tooth portions and provided on the output shaft of the electric motor, a nut pulley including a plurality of nut pulley tooth portions and provided on the nut, and an endless belt including a plurality of belt tooth portions meshed with the plurality of motor pulley tooth portions and the plurality of nut pulley tooth portions. Assuming that a belt pitch refers to a pitch between the plurality of belt tooth portions, the belt pitch in a first state refers to the belt pitch when the power steering apparatus is in an unloaded state that no electric power is supplied to the electric motor, the belt pitch in a second state refers to the belt pitch on one side pulled by the motor pulley when electric power is supplied to the electric motor, and a first pulley pitch refers to a pitch between the plurality of tooth portions of a first pulley, which is one of the motor pulley and the nut pulley that is a pulley on a smaller diameter side, the power steering apparatus satisfies $$\text{the belt pitch in the first state} < \text{the first pulley pitch,} \quad (1)$$

and $$\begin{aligned}&\text{an absolute value of (the first pulley pitch} - \text{the belt} \\ &\quad \text{pitch in the second state)} < \text{the first pulley pitch} - \\ &\quad \text{the belt pitch in the first state.} \end{aligned} \quad (2)$$

According to another configuration, in the above-described configuration, the endless belt is configured in such a manner that an absolute value of (the first pulley pitch−the belt pitch in the second state) in the equation 2 reduces as an environmental temperature increases from 20 degrees Celsius.

According to another configuration, in any of the above-described configurations, the endless belt is configured in such a manner that a linear expansion coefficient of the endless belt is smaller than a linear expansion coefficient of the first pulley.

According to further another configuration, in any of the above-described configurations, the endless belt contains a glass fiber.

According to further another configuration, in any of the above-described configurations, assuming that a second pulley pitch refers to a pitch between the plurality of tooth portions of a second pulley, which is one of the motor pulley and the nut pulley that is a pulley on a larger diameter side, the power steering apparatus satisfies $$\text{the belt pitch in the first state} < \text{the second pulley pitch,} \quad (3)$$

and $$\text{an absolute value of (the second pulley pitch} - \text{the belt pitch in the second state)} < \text{the second pulley pitch} - \text{the belt pitch in the first state.} \quad (4)$$

According to further another configuration, in any of the above-described configurations, the first pulley is the motor pulley. The second pulley is the nut pulley. The first pulley and the second pulley satisfy $$\text{the second pulley pitch} < \text{the first pulley pitch.} \quad (5)$$

According to further another configuration, in any of the above-described configurations, assuming that a first motor pulley tooth portion is one of the plurality of motor pulley tooth portions, and a first nut pulley tooth portion is one of the plurality of nut pulley tooth portions, the endless belt is configured in such a manner that, while the first nut pulley tooth portion and the plurality of belt tooth portions are being disengaged from each other after the first nut pulley tooth portion and the plurality of belt tooth portions of the endless belt start to be gradually disengaged from each other from a state completely meshed with each other according to a rotation of the motor pulley, the first motor pulley tooth portion and the plurality of belt tooth portions start to be meshed with each other, and the first motor pulley tooth portion and the plurality of belt tooth portions are completely meshed with each other.

According to further another configuration, in any of the above-described configurations, assuming that the belt pitch in a third state refers to the belt pitch on the one side where the endless belt is pulled by the motor pulley when a vehicle speed is 0 km/h and electric power is supplied to the electric motor, the endless belt satisfies $$\text{the belt pitch in the first state} < \text{the first pulley pitch} < \text{the belt pitch in the third state.} \quad (6)$$

According to further another configuration, in any of the above-described configurations, the endless belt is configured in such a manner that a value of the first pulley pitch−the belt pitch in the first state in the equation 2 is 0.3 μm or greater and 0.5 μm or smaller under an environmental temperature of 20 degrees.

The present application claims priority under the Paris Convention to Japanese Patent Application No. 2017-181978 filed on Sep. 22, 2017. The entire disclosure of Japanese Patent Application No. 2017-181978 filed on Sep. 22, 2017 including the specification, the claims, the drawings, and the abstract is incorporated herein by reference in its entirety.

REFERENCE SIGNS LIST 1 power steering apparatus
3 electric motor
5 housing
6 rack bar (steering shaft)
6a main body portion (wheel turning shaft main body portion)
8 motor output shaft (output shaft)
9 motor pulley
10 endless belt
11 nut
11a cylindrical main body portion
12 nut pulley
14 ball
15a rack bar containing space (wheel turning shaft containing space)
17a mechanism containing space (speed reducer containing space)
19 nut-side ball screw groove
20 rack bar-side ball screw groove (wheel turning-side ball screw groove)
25 motor pulley tooth portion
26 nut pulley tooth portion
27 belt tooth portion

The invention claimed is:

1. A power steering apparatus comprising:
a wheel turning shaft including a wheel turning shaft main body and a wheel turning shaft-side ball screw groove, the wheel turning shaft-side ball screw groove being a helical groove formed on the wheel turning shaft main body, the wheel turning shaft being configured to turn a steering target wheel according to a movement of the wheel turning shaft main body in a longitudinal direction thereof;
a housing including a wheel turning shaft containing space containing at least a part of the wheel turning shaft, and a speed reducer containing space provided at an intermediate position of the wheel turning shaft containing space in the longitudinal direction of the wheel turning shaft main body; and
a nut including a cylindrical main body portion and a nut-side ball screw groove, the nut-side ball screw groove being a helical groove provided on an inner peripheral side of the cylindrical main body,
the cylindrical main body being rotatably provided in the speed reducer containing space and surrounding the wheel turning shaft,
the power steering apparatus further comprising:
a plurality of balls provided between the wheel turning shaft-side ball screw groove and the nut-side ball screw groove;
an electric motor including an output shaft having a rotational axis provided at a position offset from a rotational axis of the nut;
a motor pulley including a plurality of motor pulley tooth portions and provided on the output shaft of the electric motor;
a nut pulley including a plurality of nut pulley tooth portions and provided on the nut; and
an endless belt including a plurality of belt tooth portions meshed with the plurality of motor pulley tooth portions and the plurality of nut pulley tooth portions,
wherein, assuming that a belt pitch refers to a pitch between the plurality of belt tooth portions,
the belt pitch in a first state refers to the belt pitch when the power steering apparatus is in an unloaded state such that no electric power is supplied to the electric motor, the belt pitch in a second state refers to the belt pitch on one side pulled by the motor pulley when electric power is supplied to the electric motor, and a first pulley pitch refers to a pitch between the plurality of tooth portions of a first pulley, which is one of the motor pulley and the nut pulley that is a pulley having a smaller diameter among the motor pulley and the nut pulley, the power steering apparatus satisfies the following conditions:

the belt pitch in the first state<the first pulley pitch, (i)

and an absolute value of (the first pulley pitch−the belt pitch in the second state)<the first pulley pitch−the belt pitch in the first state, and (ii)

wherein, assuming that the belt pitch in a third state refers to the belt pitch on the one side where the endless belt is pulled by the motor pulley when a vehicle speed is 0 km/h and electric power is supplied to the electric motor, the endless belt satisfies the following condition:

the belt pitch in the first state<the first pulley pitch<the belt pitch in the third state. (iii)

2. The power steering apparatus according to claim 1, wherein the endless belt is made of synthetic resin or rubber, and is configured in such a manner that an absolute value of (the first pulley pitch−the belt pitch in the second state) in condition (ii) reduces as an environmental temperature increases from 20 degrees Celsius.

3. The power steering apparatus according to claim 2, wherein the endless belt contains a glass fiber, and is configured in such a manner that a linear expansion coefficient of the endless belt is smaller than a linear expansion coefficient of the first pulley made of a metallic material or synthetic resin.

4. The power steering apparatus according to claim 1, wherein, assuming that a second pulley pitch refers to a pitch between the plurality of tooth portions of a second pulley, which is a pulley that is not the first pulley among the motor pulley and the nut pulley, the power steering apparatus satisfies the following conditions:

the belt pitch in the first state<the second pulley pitch, (iv)

and an absolute value of (the second pulley pitch−the belt pitch in the second state)<the second pulley pitch−the belt pitch in the first state. (v)

5. The power steering apparatus according to claim 4, wherein the first pulley is the motor pulley,
wherein the second pulley is the nut pulley, and
wherein the first pulley and the second pulley satisfy the following condition:

the second pulley pitch<the first pulley pitch. (vi)

6. The power steering apparatus according to claim 5, wherein, assuming that a first motor pulley tooth portion is one of the plurality of motor pulley tooth portions, and a first nut pulley tooth portion is one of the plurality of nut pulley tooth portions, the endless belt is configured in such a manner that, while the first nut pulley tooth portion and the plurality of belt tooth portions are being disengaged from each other after the first nut pulley tooth portion and the plurality of belt tooth portions of the endless belt start to be disengaged from each other from a state completely meshed with each other according to a rotation of the motor pulley, the first motor pulley tooth portion and the plurality of belt tooth portions start to be meshed with each other, and the first motor pulley tooth portion and then the plurality of belt tooth portions are completely meshed with each other.

7. The power steering apparatus according to claim 1, wherein the endless belt is configured in such a manner that a value of the first pulley pitch−the belt pitch in the first state under condition (ii) is 0.3 μm or greater and 0.5 μm or smaller under an environmental temperature of 20 degrees Celsius.

* * * * *